Figures 1, 4:
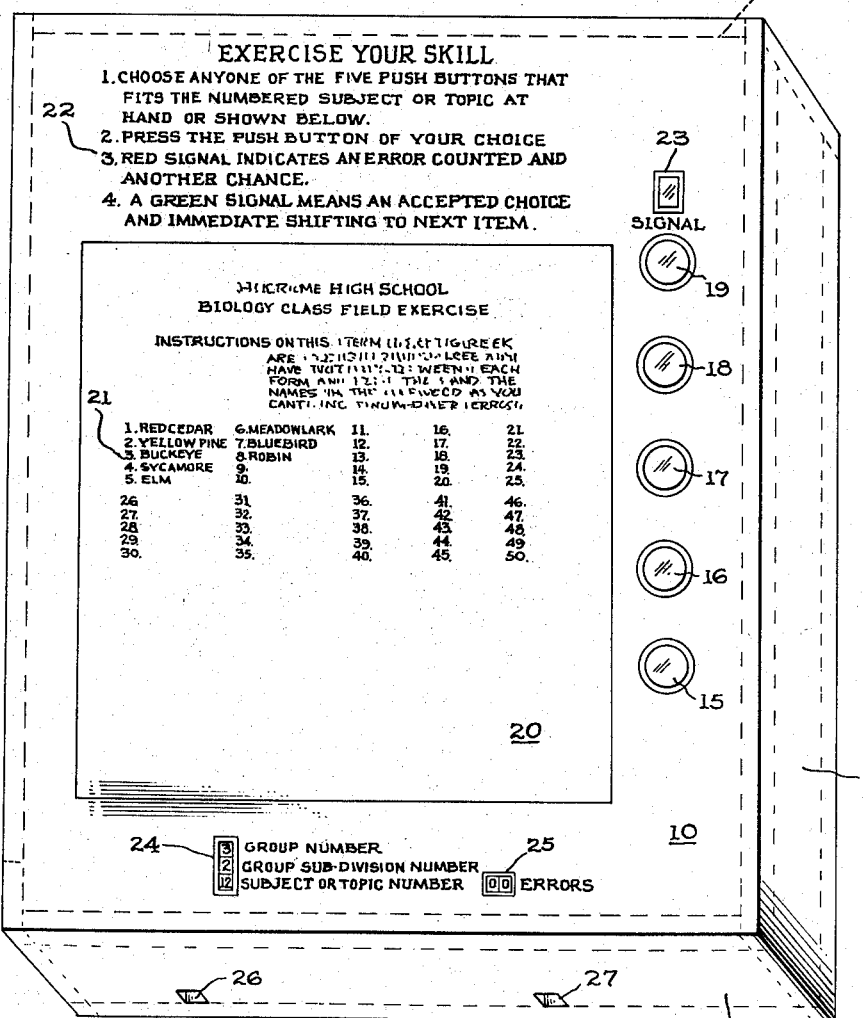

Aug. 2, 1960 H. A. ARNOLD ET AL 2,947,092
EDUCATIONAL, RECREATIONAL, AND TESTING APPARATUS
Filed June 20, 1957 4 Sheets-Sheet 1

INVENTORS
HAROLD A. ARNOLD
JOHN B. SHARP
BY Cameron, Kerkam & Sutton
ATTORNEYS

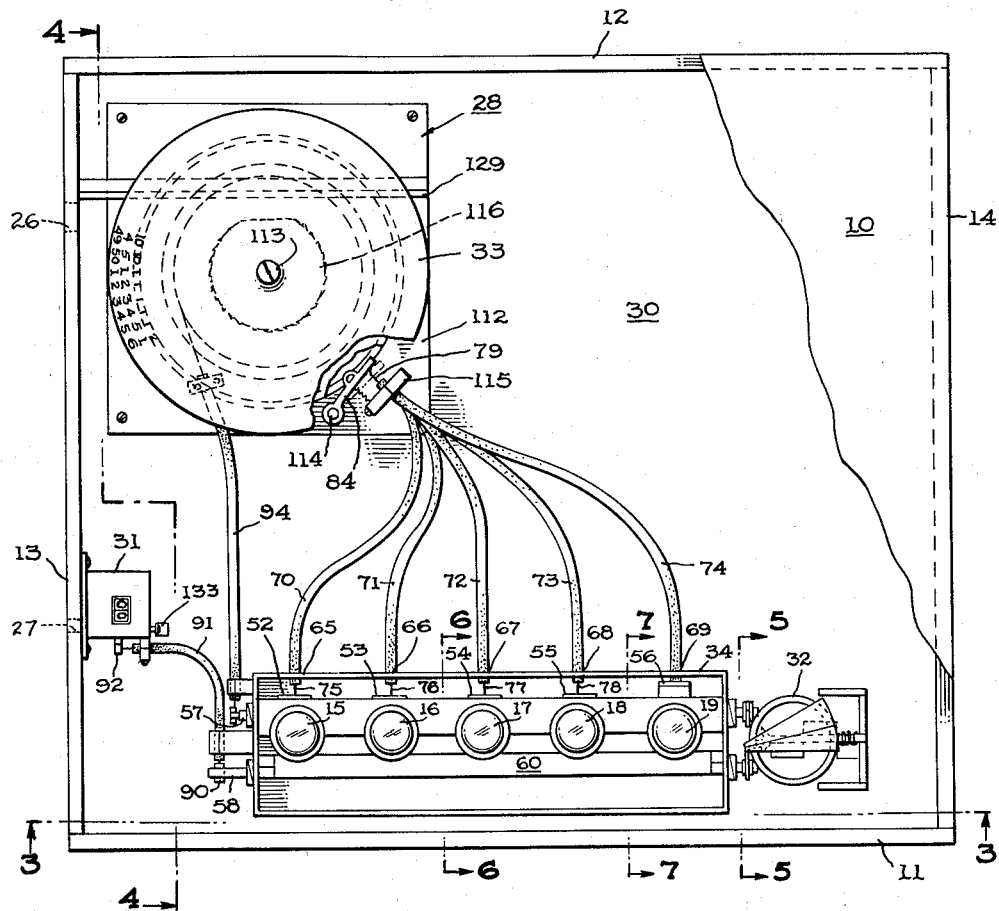
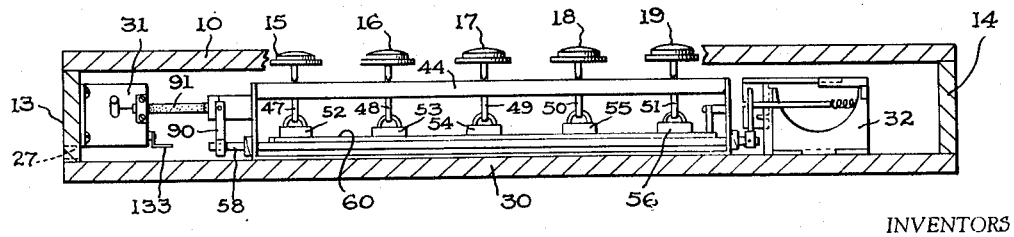

Aug. 2, 1960  H. A. ARNOLD ET AL  2,947,092
EDUCATIONAL, RECREATIONAL, AND TESTING APPARATUS
Filed June 20, 1957  4 Sheets-Sheet 3

INVENTORS
HAROLD A. ARNOLD.
JOHN B. SHARP.
BY Cameron, Kerkam & Sutton
ATTORNEYS Aug. 2, 1960 H. A. ARNOLD ET AL 2,947,092
EDUCATIONAL, RECREATIONAL, AND TESTING APPARATUS
Filed June 20, 1957 4 Sheets-Sheet 4
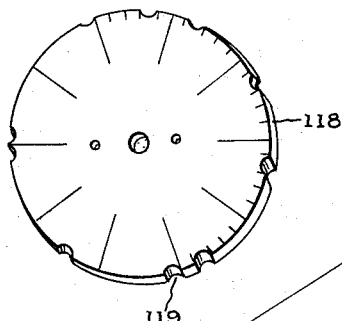
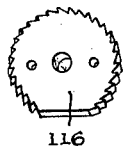
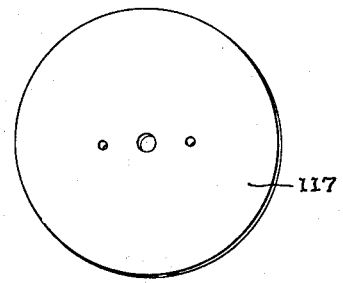
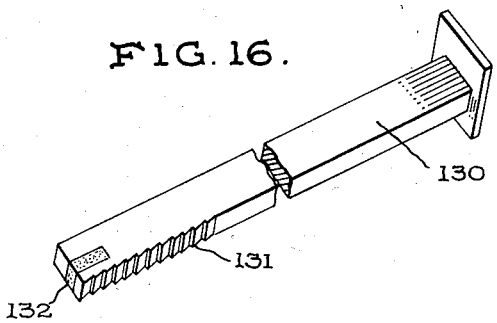
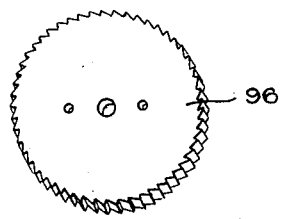
INVENTORS
HAROLD A. ARNOLD.
JOHN B. SHARP
BY Cameron, Kerkam & Sutton
ATTORNEYS United States Patent Office 2,947,092
Patented Aug. 2, 1960

2,947,092

EDUCATIONAL, RECREATIONAL, AND TESTING APPARATUS

Harold A. Arnold and John B. Sharp, Knoxville, Tenn.; Icesy Hayes Arnold, as administratrix of the estate of Harold A. Arnold, deceased, assignors to The University of Tennessee Research Corporation, Knoxville, Tenn., a corporation of Tennessee Filed June 20, 1957, Ser. No. 666,907

10 Claims. (Cl. 35—48)

This invention relates to apparatus which may be used in teaching, which may be used for testing of students, and which may be used for recreational purposes wherein the user of the apparatus seeks to provide correct information in a field of education or knowledge about items displayed in association with the apparatus.

More particularly this invention relates to such apparatus used in conjunction with objects, items, or displays in a field of instruction or knowledge in which the user of the apparatus actuates mechanism associated with what the user of the apparatus considers to be the correct information with respect to the item, display or object. If the selection made by the user of the apparatus is correct his correct selection may be signalled, or errors may be signalled, and when the apparatus is being utilized for testing purposes counting apparatus may be actuated to keep a record of correct selections or of wrong selections so that a score may be obtained.

Educational, testing and recreational apparatus of this general type have heretofore been suggested in the art. The apparatus of the present invention has advantages over those of the prior art in ease of construction, compactness, long life, low maintenance, and in the fact that the present apparatus is physically self-sufficient and may be used in all fields of education and testing without change to its basic structure and without the need of physical connection to the subject matter with which the apparatus is to be employed.

It is accordingly an object of the present invention to provide novel educational, recreational, and testing apparatus of improved and simplified construction which is relatively cheap and easy to make and to maintain.

Another object is to provide such apparatus for multipurpose teaching, testing and recreation which may be used with pictures, graphs, charts, maps, physical specimens, and similar media.

Another object is to provide such apparatus which may be used in any field of teaching without change to its basic construction by the simple changing of the subject matter used with the apparatus.

Another object is to provide such apparatus which may be employed for industrial or commercial advertising or training by a suitable selection of material with which the apparatus is employed.

Another object of the invention is to provide for multiple action from individual actuators as in a group of five topics a correct decision yields a green signal, automatic shifting of a correlating medium and the cocking of another actuator for another correct decision and an incorrect decision yields a red signal and the counting of one error.

Another object of the invention is to provide for arrangement of topics or other educational media in groups of such number so as to present the exercise in accordance with accepted educational techniques.

Another object of the invention is to provide such apparatus with a correlating medium that selects one of the several actuators that denotes the correct result.

Another object of the invention is to provide for the use of an unlimited amount of educational media by the adjustment of the limits of the correlating medium.

Another object of the invention is to reduce the time and routine drudgery of exercise preparation as well as the exercise time period itself, thus facilitating the more efficient use of both the operator and instructor's time.

Another object of the invention is to provide a means for facilitating the learning process by yielding an immediate self-correcting, self-scoring exercise result in an interesting game-like manner.

Another object of the invention is to provide a training medium for industrial personnel or others, wherein an impersonal exercise is presented without compulsion or embarrassment to the individual operator, but yielding a collective result necessary for decision making.

Another object of the invention is to relieve the instructor of the task of exercise preparation, as well as scoring, by the use of such auxiliaries as standard work books and film strips prepared and employed in conjunction with the apparatus.

Other and further objects of the present invention will appear from the following description of an illustrative embodiment thereof.

The apparatus of the present invention is capable of various embodiments and is actuated mechanically within the scope of the invention. For purposes of illustration a mechanical embodiment of the present invention will be described hereinafter to illustrate the same. This illustrative embodiment of the invention should in no way be construed as defining or limiting the same and reference should be had to the appended claims to determine the scope of the invention.

Figure 5:
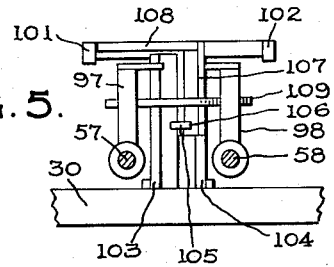
Figure 6:
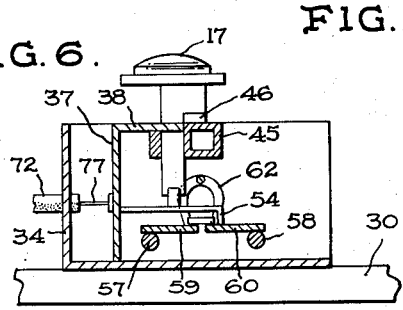
Figure 7:
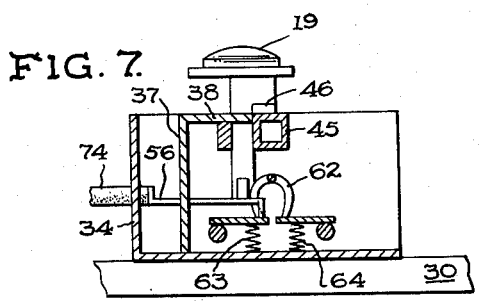
Figure 8:
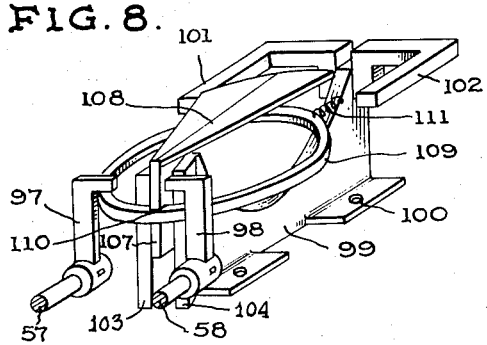
Figure 10:
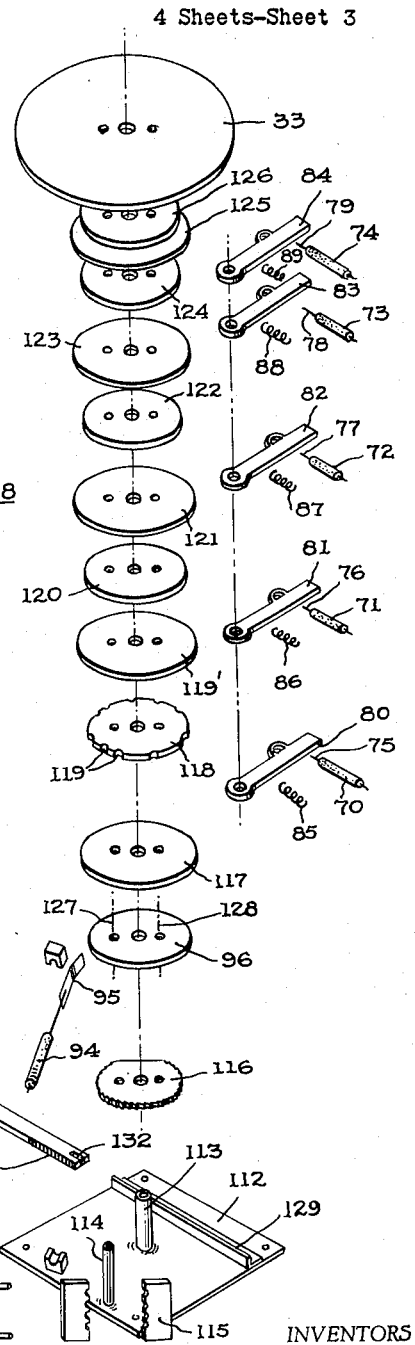

In the accompanying drawings, in which like reference characters indicate like parts, Fig. 1 is a view of an illustrative embodiment of the present invention with the sets of answers set up for teaching and testing in the field of biology and showing the general appearance of the device;

Fig. 2 is a view from above of the embodiment of Fig. 1 with the upper cover partially removed;

Fig. 3 is a sectional view on the line 3—3 of Fig. 2;
Fig. 4 is a sectional view on the line 4—4 of Fig. 2;
Fig. 5 is a sectional view on the line 5—5 of Fig. 2;
Fig. 6 is a sectional view on the line 6—6 of Fig. 2;
Fig. 7 is a sectional view on the line 7—7 of Fig. 2;
Fig. 8 is a perspective view of the signalling apparatus;
Fig. 9 is an enlarged detail of the push button construction of Fig. 2;
Fig. 10 is an exploded view of the correlating drum of Fig. 2;
Fig. 11 is a view of the indicator disc of the correlating drum;
Fig. 12 is a view of a correlating disc;
Fig. 13 is a view of the resetting gear of the correlating drum;
Fig. 14 is a view of a spacer disc of the correlating drum;
Fig. 15 is a view of the ratchet gear of the correlating drum; and
Fig. 16 is a view of the resetting key.

As pointed above, the apparatus of the present invention may be used in all fields of teaching and testing when selected objects, items or displays in any given field of knowledge or teaching are associated with the apparatus. In the illustrative embodiment of Fig. 1 the apparatus is set up for teaching and testing in the field of biology and various physical specimens in this field may be arranged about the apparatus. A sheet of answers divided into groups of five is provided for each test or use of the device and is arranged on the upper surface of the case or housing adjacent five push buttons, one such push button corresponding to one of the answers of the group of five answers. The push button corresponding to the answer considered by the user to correctly identify the selected object or display is depressed. If the proper push button is depressed by the user of the apparatus correctly identifying the specimen a green signal will show. If an incorrect push button is depressed incorrectly identifying the specimen a red signal will show indicating that the user of the apparatus is in error in selecting the designation or description of the specimen. A counter may be used to automatically count either errors or correct answers.

An indicator is provided which automatically designates the group member, the group subdivision number and the subject or topic number so that the user will always know which group of five answers or designations is under consideration.

The apparatus is so constructed and arranged that the selection of a wrong answer or designation will not advance the correlating drum although the error will be stored but a correct answer or designation will advance the correlating drum so that the apparatus is ready for use with the next set of five answers or designations.

Referring now to the several figures, and more particularly to Figs. 1 and 2, the embodiment of the present invention thereof is mounted in a suitable housing or box having an upper surface 10, side walls 11 and 12, and end walls 13 and 14. Any suitable number of push button type actuators or selector means, here shown as five in number with each selector means corresponding to one of the five answers in each group of answers are mounted in upper surface 10 at 15, 16, 17, 18 and 19 preferably aligned at one side thereof with available area adjacent thereto for locating the instruction sheet 20 bearing the answers or designations in groups of five as shown at 21. Selector means 19 corresponds to the first answer of each group of answers, selector means 18 corresponds to the second answer in each group of answers, and so on. Upper surface 10 also carries permanent instructions as indicated generally at 22.

A suitable window 23 is provided in surface 10 to show a signal of appropriate color, usually green, for a correct answer, and an appropriate color, usually red, for an incorrect answer, in a manner which will more fully appear hereinafter. A second window 24 is provided in surface 10 through which the indicator disc is visible to show the group number, group subdivision number, and subject or topic number of the instruction sheet 20 under consideration. A third window 25 is provided in surface 10 to view the counter which scores errors for an easy determination of the total score.

End 13 is provided with a suitable aperture 26 through which a resetting key is inserted to reset the correlating drum as will appear more fully hereinafter, and a second suitable aperture 27 is provided therein for insertion of the resetting key to clear the error counting mechanism.

In Fig. 2 the top 10 is partially cut away to show the general assembly of the actuating buttons 15-19 and the correlating drum generally indicated at 28 which is suitably mounted on bottom 30 of the apparatus housing. The error counting mechanism, of conventional type, is seen at 31 and the signalling device seen through window 23 is shown generally at 32. The indicator disc seen through window 24 is shown at 33.

Referring now to Figs. 3, 4, 5, 6, 7, and 9, and particularly to Fig. 9, the five push buttons 15-19 are mounted in a housing having a bottom 33', which is suitably secured to bottom 30 of the apparatus housing, and a backwall 34 and end walls 35 and 36. An L-shaped plate 37 is secured to bottom 33' and has leg 38 thereof extending parallel to bottom 33'. Leg 38 is provided with spaced slots 39-43 in which the stems of push buttons 15-19 are mounted for vertical movement, respectively, and leg 38 also carries a suitable and conventional lockout mechanism shown at 44 to prevent more than one of the buttons 15-19 from being depressed at one time. Lockout mechanism 44 is of conventional type such as is shown in U.S. Patents Nos. 1,688,114, 1,948,650 and 2,156,531 and includes segments slidably mounted in tubular member 45 carried by leg 38. Wedge-shaped portions 46 are provided on the stem of each of the buttons 15-19 to separate these segments so that depression of any one of the buttons 15-19 will move the segments to prevent depression of any of the other of the buttons.

Buttons 15-19 are each provided with stems 47-51, respectively and each of the stems 47-51 engages an L-shaped contact member or means 52-56, respectively, which is slidable or shiftable with respect thereto. In Fig. 9 contact members 52-55 are shown in error or incorrect answer counting position while contact member 56 is shown in correct answer position.

A pair of spaced parallel bars 57 and 58 are mounted for rotation in ends 35 and 36 and extend therethrough. A plate 59 is secured to bar 57 and extends between ends 35 and 36 and a plate 60 is secured to bar 58 and extends from end 35 to end 36. Plates 59 and 60 are spaced apart as at 61 and are enageageable by contact members 52-56. A permanent magnet 62 carried by end 35 releasably holds plates 59 and 60 in their upward position as shown in Fig. 9 and springs 63 and 64 (Fig. 7) engage beneath plates 59 and 60, respectively, to urge them upwardly into engagement with magnet 62.

As will be more clearly seen in Figs. 2, 6 and 7, backwall 34 is suitably apertured at 65-69 to receive the sheaths 70-74, respectively, of Boudoin-type cables and sheaths 70-74 are suitably secured in aperture 65-69 as by brazing. Each wire 75-79 of the Boudoin-type cables is secured at one end to a contact member 52-56, respectively, and each wire 75-79 is connected at its other end to suitable followers 80-84, respectively (Fig. 10). Followers 80-84 are urged by springs 85-89, respectively, into engagement with the appropriate and adjacent correlating disc of the correlating drum 28, as will appear more fully hereinafter.

One end of shaft 58 carries arm 90 for rotation therewith (Figs. 2 and 3); the wire of a suitable Boudoin-type cable 91 is secured thereto; and the other end of the wire is secured to actuating member 92 of error counter 31 so that each rotation of shaft 58 will count one error on counter 31.

As best seen in Figs. 2 and 4, one end of shaft 57 carries arm 93 for rotation therewith and the wire of a suitable Boudoin-type cable 94 is secured thereto for movement therewith. The other end of the wire of cable 94 is connected to dog 95 which engages ratchet gear 96 (Figs. 10 and 15) of the correlating drum 28 as will more fully appear hereinafter.

The other end of shaft 57 terminates in arm 97 and the other end of shaft 58 terminates in arm 98, arms 97 and 98 being opposed as shown in Fig. 8. A signal base 99 is suitably mounted on bottom 30 of apparatus housing as at 100 to lie in a plane parallel to shafts 57 and 58 and extends from adjacent arms 97 and 98. Base 99 is provided at its upper end with stops 101 and 102 and has extensions 103 and 104 at its other extremity forming between them a V-shaped bearing. A stop 105 is mounted in the bearings formed by extensions 103 and 104 and stop 105 is received in a notch 106 of vertical member 107 which is mounted on stop 105 for oscillation in the V-shaped bearing formed by extensions 103 and 104. Vertical member 107 carries signal flag 108 which may show green in one half thereof and red in the other half thereof to be viewed through window 23.

A ring 109 is notched at 110 to embrace vertical member 107 and spring 111 extends between ring 109 and frame 99 to hold vertical member 107 with yieldable tension in the V-shaped bearing. Rotation of either arm 97 or 98 to engage vertical member 107 will flip member 107 to one extreme or the other in the V-shaped notch thus displaying either one color or the other of flag 108 through window 23. In the position shown in Figs. 5 and 8, flag 108 is in its extreme left-hand position to show green through window 23 to indicate a correct answer.

The construction of correlating drum 28 is best seen in Figs. 2, 4, and 10 with elements thereof shown in Figs. 11–15. Correlating drum 28 includes a base plate 112 which is suitably secured to bottom 30 of the apparatus housing. Base plate 112 carries a vertical post 113 and, spaced therefrom and parallel thereto, carries a second vertical post 114. A clamping structure 115 mounted on base 112 receives and holds the cable sheaths 70–74 as seen in Fig. 2. The several followers 80–84 are mounted for rotation on post 114 and springs 85–89 bear against clamp 115 to urge followers 80–84 in counterclockwise rotation as seen in Figs. 2 and 10.

Referring particularly to Fig. 10, a resetting gear 116, shown in detail in Fig. 13, is mounted for rotation on post 113 and is followed by ratchet gear 96, shown in detail in Fig. 15 with 50 teeth, which is also mounted for rotation on post 113. A spacer disc 117, shown in detail in Fig. 14, comes next on post 113 and is followed by a correlating disc 118 for follower 80 which is also mounted for rotation on post 113. Correlating disc 118 and each of the correlating discs to be described below are divided into 50 divisions for a 50 topic exercise, as shown in Fig. 12, and one notch 119 is cut in every group of five divisions on the circumference of disc 118. The order of the notches 119 upon individual correlating discs within the five divisions can be varied and only one of many possible arrangements is shown. Disc 118 is followed on shaft 113 by spacer disc 119' which in turn is followed by correlating disc 120 for follower 81. A spacer disc 121 follows disc 120 on post 113 and in turn is followed by correlating disc 122 for follower 82. Another spacer disc 123 follows disc 122 on post 113 and is followed in turn by correlating disc 124 for follower 83. Disc 124 is followed on post 113 by spacer disc 125 which is followed on post 113 by correlating disc 126 for follower 84 with indicator disc 33 on top of the stack of discs on post 113 so as to be visible through opening 23. All of the several discs and gears are keyed together for rotation as a unit by locking pins 127 and 128 which pass through suitable holes formed in all of the discs and gears.

A track 129 is mounted on base 112 for reset key 130. Reset key 130 is shown in detail in Fig. 16 where it is seen to have a rack 131 formed on an edge thereof to engage the teeth of resetting gear 116. Key 130 is also provided with an insert of magnetic material at 132 to engage portion 133 of counter 31 to return counter 31 to zero position. When key 130 is inserted through opening 26 and rides on track 129, rack 131 will engage the teeth of resetting gear 116 and rotate the same until the flat portion thereof as seen in Fig. 13 comes parallel to the edge of key 130. In this position indicator disc 33 shows the starting designation 1, 1, 1 through opening 23 and key 130 can be withdrawn without disturbing the setting of the correlating drum 28.

The arrangement of the answers or designations in each group of five on the sheet or card 20 must be correlated with the position of the notches 119 in the appropriate correlating disc 118. Thus if answer number 1 of the first group of five, "red cedar," is the correct answer or designation for the specimen exhibited to the user of the apparatus, then notch 119 of correlating disc 126 must be so positioned that follower 84 enters the notch rotating follower 84 about post 114 and drawing wire 79 to the left as seen in Fig. 2 thus drawing contact member 56 to the left as seen in Fig. 9.

The user then makes the correct selection by pressing button 19 and contact member 56 is pressed against plate 59 and rotates rod 57. Rotation of 57 will rotate arm 97 and move flag 108 to show its green portion through window 23 thus signalling a correct answer. At the same time, rotation of rod 57 will rotate arm 93 and move dog 95 to the left as seen in Fig. 10, rotating ratchet gear 96 one notch of its fifty notches to rotate correlating drum 28 to its next position and to set the correlating drum for selection of the answer from the next set of five answers designated through window 24 as 1, 2, 2.

If, on the other hand, the user makes a wrong selection and depresses any of buttons 15, 16, 17, or 18, it being remembered that lockout mechanism 44 prevents suppression of more than one button at a time, the appropriate contact member 52–55 will bear against plate 60 and rotate rod 58. Rotation of rod 58 rotates arm 98 in a counterclockwise direction as seen in Fig. 8 and flips signal 108 to show red through window 23 to designate a wrong answer. At the same time rotation of rod 58 rotates arm 90 in a counterclockwise direction as seen in Fig. 4 and the wire in cable 91 actuates counter 31 to count an error. The correlating drum 28 is not rotated and remains in place until a correct answer is made.

This procedure is followed by the user or users of the apparatus until all of the selections for the groups of five answers or designations have been made at which time indicator disc 33 shows the designation through window 23 of 10, 5, 50. The apparatus is then returned to initial position by inserting reset key through opening 26 so that rack 131 engages resetting gear 116 and rotates the gear 116, as above described, until its flat portion comes parallel to key 130. Key 130 is then withdrawn and inserted through aperture 27 so that its magnetized portion 132 engages part 133 of counter 31. Withdrawal of key 130 then resets counter 131 to its zero position in known manner.

It should now be apparent that the present invention in every way satisfies the several objectives described above.

Changes in or modifications to the above-described illustrative embodiment of this invention may now be suggested to those skilled in the art without departing from the present inventive concept. Reference should therefore be had to the apended claims to determine the scope of this invention.

What is claimed is:

1. In apparatus as described, a correlating drum, a plurality of manually actuated selector means, shiftable contact means for each of said selector means, means responsive to the position of said correlating drum for each of said contact means adapted to shift said contact means from an extreme position to another extreme position, a counter, a signal device, means responsive to said contact means in one extreme position upon actuation of the corresponding selector means for actuating said counter and said signal device, means for shifting said correlating drum in step-by-step movement and second means responsive to said contact means in the other extreme position upon actuation of the corresponding selector means for actuating said shifting means to move said correlating drum one step and for actuating said signal device.

2. In apparatus as described, a correlating drum, a plurality of correlating discs in said drum, a follower for each of said correlating discs, shiftable contact means for each of said followers movable from an extreme position to another extreme position, manually actuated selector means for each of said contact means, a counter, a signal device, means for rotating said drum in step-by-step rotation, means responsive to said contact means in one extreme position upon actuation of the corresponding selector means for actuating said counter and said signal device, and second means responsive to said contact means in the other extreme position upon actuation of the corresponding selector means for actuating said drum rotating means to rotate said drum one step and for actuating said signal device.

3. In apparatus as described, a correlating drum, a ratchet gear for rotating said drum, a plurality of correlating discs in stacked arrangement in said drum, a spring-loaded follower for each of said discs, contact means for each of said followers shiftable by the corresponding follower from an extreme position to another extreme position, manually actuated selector means for each of said contact means, a counter, a signal device, means for rotating said ratchet gear in step-by-step rotation including a dog engaging said gear, means responsive to said contact means in one extreme position upon actuation of the corresponding selector means for actuating said counter and said signal device, and second means responsive to said contact means in the other extreme position upon actuation of the corresponding selector means for moving said dog and rotating said gear and said drum one step and for actuating said signal device.

4. In apparatus as described, a correlating drum, a reset gear, a ratchet gear and a plurality of spaced correlating discs in stacked arrangement in said drum, a spring-loaded follower for each of said correlating discs, contact means for each of said followers shiftable by the corresponding follower from an extreme position to another extreme position, manually actuated selector means for each of said contact means, a counter, a signal device, means for rotating said ratchet gear and said drum in step-by-step rotation including a dog engaging said ratchet gear, means responsive to said contact means in one extreme position upon actuation of the corresponding selector means for actuating said counter and said signal device, second means responsive to said contact means in the other extreme position upon actuation of the corresponding selector means for moving said dog and rotating said ratchet gear and said drum one step and for actuating said signal device and manually actuated means for rotating said reset gear to bring said drum to an initial position.

5. In apparatus as described, a correlating drum including a reset gear, a ratchet gear and a plurality of spaced correlating discs in stacked arrangement for rotation as a unit, a spring-loaded follower for each of said discs, contact means for each of said followers shiftable by the corresponding follower from an extreme position to another extreme position, manually actuated selector means for each of said contact means, a counter, a signal device movable from one extreme position to an opposite extreme position, a dog engaging said ratchet gear, means rotated by said contact means in one extreme position upon actuation of the corresponding selector means for actuating said counter and for moving said signal device to one extreme position, second means rotated by said contact means in its other extreme position upon actuation of the corresponding selector means for moving said dog and rotating said ratchet gear and said drum one step and for moving said signal device to its other extreme position, and key means engageable with said reset gear for rotating said drum to an initial position.

6. Apparatus as described in claim 5 including an indicator disc for said drum mounted for rotation with and on top of said stacked correlating discs.

7. Apparatus as described in claim 5 including flexible mechanical means connecting each of said followers and the corresponding contact means, flexible mechanical means connecting said dog and said second means rotated by said contact means, and flexible mechanical means connecting said counter and said first means rotated by said contact means.

8. Apparatus as described in claim 5 in which said signal device includes a spring-loaded pivot and a signal indicator carried by said pivot.

9. Apparatus as described in claim 5 in which said first means rotated by said contact means includes a shaft, an arm on one end of said shaft actuating said counter, an arm on the other end of said shaft actuating said signal device and in which said second means rotated by said contact means includes a second shaft, an arm on one end of said second shaft moving said dog and an arm on the other end of said second shaft actuating said signal device.

10. Apparatus as described in claim 9 including a plate secured to each of said shafts and normally lying in opposed coplanar spaced-apart relationship, and spring means urging said plates into coplanar relationship.

References Cited in the file of this patent

UNITED STATES PATENTS

| | | |
|---|---|---|
| 971,865 | Stocklmier | Oct. 4, 1910 |
| 1,321,292 | Doyle | Nov. 11, 1919 |
| 1,729,226 | Pressey | Mar. 4, 1930 |
| 2,049,178 | Samstag | July 28, 1936 |
| 2,213,974 | Baker | Sept. 10, 1940 |
| 2,317,107 | Oesch | Apr. 20, 1943 |
| 2,499,323 | McCash | Feb. 28, 1950 |
| 2,564,089 | Williams | Aug. 14, 1951 |
| 2,690,621 | Dean | Oct. 5, 1954 |